United States Patent
Heinrich et al.

(10) Patent No.: US 8,769,014 B2
(45) Date of Patent: Jul. 1, 2014

(54) UNIVERSAL COLLABORATION ADAPTER FOR WEB EDITORS

(75) Inventors: Matthias Heinrich, Dresden (DE); Franz Lehmann, Ilmenau-Manebach (DE)

(73) Assignee: SAP AG, Walldorf (DE)

(*) Notice: Subject to any disclaimer, the term of this patent is extended or adjusted under 35 U.S.C. 154(b) by 54 days.

(21) Appl. No.: 13/304,418

(22) Filed: Nov. 25, 2011

(65) Prior Publication Data

US 2013/0138733 A1 May 30, 2013

(51) Int. Cl.
*G06F 15/18* (2006.01)
*G06F 17/30* (2006.01)

(52) U.S. Cl.
USPC ........... 709/204; 709/203; 709/223; 709/225; 709/246; 709/248; 715/764; 715/765; 715/766; 715/788; 725/14; 725/105; 725/97; 725/114; 725/62

(58) Field of Classification Search
CPC .......... G06F 15/18; G06F 17/30; H04L 67/16
USPC ......... 709/204, 203, 223, 225, 246, 248, 217, 709/221, 219; 715/256, 513, 234
See application file for complete search history.

(56) References Cited

U.S. PATENT DOCUMENTS

| | | | |
|---|---|---|---|
| 7,028,306 B2 * | 4/2006 | Boloker et al. | 719/310 |
| 2006/0047555 A1 * | 3/2006 | Kang et al. | 705/9 |
| 2007/0245232 A1 * | 10/2007 | Wake et al. | 715/513 |
| 2009/0070663 A1 * | 3/2009 | Fan et al. | 715/234 |
| 2011/0209181 A1 * | 8/2011 | Gupta et al. | 725/62 |
| 2011/0258538 A1 * | 10/2011 | Liu et al. | 715/256 |
| 2013/0066848 A1 * | 3/2013 | Tuttle et al. | 707/711 |

OTHER PUBLICATIONS

Chengzheng Sun, Steven Xia, David Sun, David Chen, Haifeng Shen and Wentong Cai; Transparent adaptation of single-user applications for multi-user real-time collaboration; ACM Transactions on Computer-Human Interaction (TOCHI); vol. 13 Issue 4, Dec. 2006; ACM, New York, USA; (http://dl.acm.org/citation.cfm?id=1188821).

* cited by examiner

*Primary Examiner* — Jude Jean Gilles (57) ABSTRACT

Various embodiments of systems and methods for a universal collaboration adapter for web editors are described herein. In one aspect, the method executed by one or more computers in a network of computers includes analyzing a document object model (DOM) representing a document in a tree structure and identifying an event or manipulation associated with the DOM. Typically, the DOM manipulations correspond to the document manipulations. An operation corresponding to the identified event is selected. The operation is sent to a generic collaboration engine for transmission to a server. The server transmits the operation to various participants for collaborative editing. The identification of the DOM manipulations (instead of editor-specific manipulations) provides a universal collaboration adapter for various editors. Further, recording or identifying local DOM manipulations and replaying remote DOM manipulations enable transforming a single-user web editor into the multi-user or collaborative web editor.

18 Claims, 8 Drawing Sheets

UNIVERSAL COLLABORATION ADAPTER FOR WEB EDITORS

BACKGROUND

A web-based collaboration tool (e.g., a web editor) helps geographically dispersed users or teams to jointly create or modify a document. The document may be a text document, a software diagram, a table, and the like. The Collaboration tools allow the users to join a shared editing session to edit any part of the document from anywhere and at anytime. Collaboration tools usually include a synchronization component to resolve conflicts while the document is being edited by several users. Typically, the synchronization component uses a conflict resolution scheme to resolve conflicts. The synchronization component may be linked to the collaboration tool through a collaboration adapter. Each collaboration tool or editor use their specific collaboration adapter to link to the synchronization component. Typically, each collaboration tool implements a highly tailored collaboration adapter suitable for the specific collaboration tool or editor.

However, to develop and maintain different collaboration adapters specifically for different editors is a waste of resources.

SUMMARY OF THE INVENTION

Various embodiments of systems and methods for universal collaboration adapter are described herein. In one aspect, the method executed by one or more computers in a network of computers includes identifying a document object model (DOM) representing a document, identifying an event associated with the document object model, selecting an operation representing the identified event, and transferring the operation to a generic collaboration engine for replaying the operation or transmitting the operation to various participants (e.g., remote users) through a server.

These and other benefits and features of embodiments of the invention will be apparent upon consideration of the following detailed description of preferred embodiments thereof, presented in connection with the following drawings.

BRIEF DESCRIPTION OF THE DRAWINGS

The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for providing a universal collaboration adapter for web editors are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
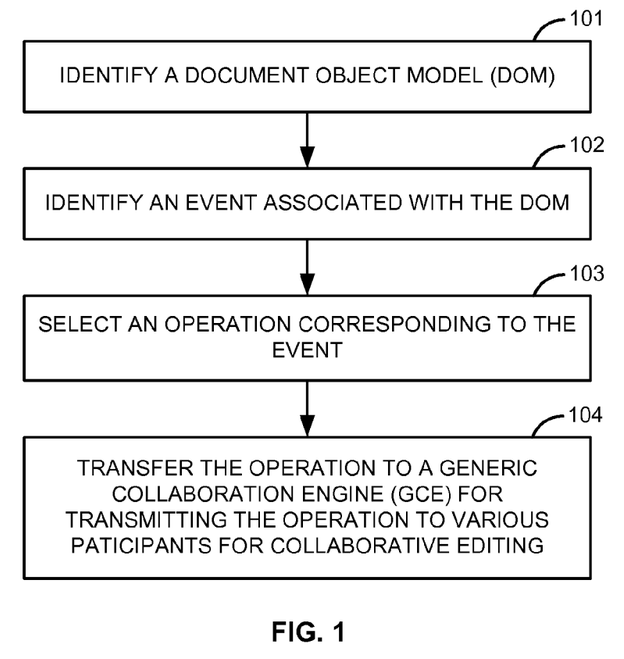
FIG. 1 is a flow chart illustrating the steps performed to provide a universal collaboration adapter for recording manipulations associated with a document object model, according to various embodiments of the invention.

FIG. 1 is a flowchart illustrating a method for providing a universal collaboration adapter to record and replay manipulations associated with a document object model (DOM), according to one embodiment. Typically, the DOM representing a document is identified at step 101. According to one embodiment, the DOM may be a tree structure. Once the DOM is recognized, any manipulation on the DOM is identified and recorded. Typically, the DOM is manipulated according to a manipulation performed on the document. The DOM may be manipulated by executing an action or DOM operation. An event corresponding to the DOM operation is triggered. The event is identified at step 102. An operation (e.g., an operational transformation or OT operation) corresponding to the identified event is selected at step 103. The event is transformed (converted) to the corresponding operation supported by a generic collaboration engine (GCE). The operation is transferred to the GCE at step 104. In one embodiment, the GCE sends the operation to a server for transmission to various participants for collaborative editing.

Figure 2:
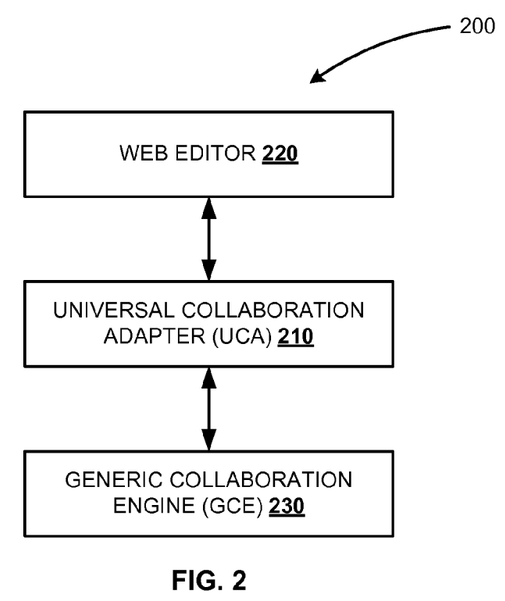
FIG. 2 is a block diagram of a system including a universal collaboration adapter for recording and replaying manipulations associated with the document object model of a web editor, according to an embodiment of the invention.
Figure 3:
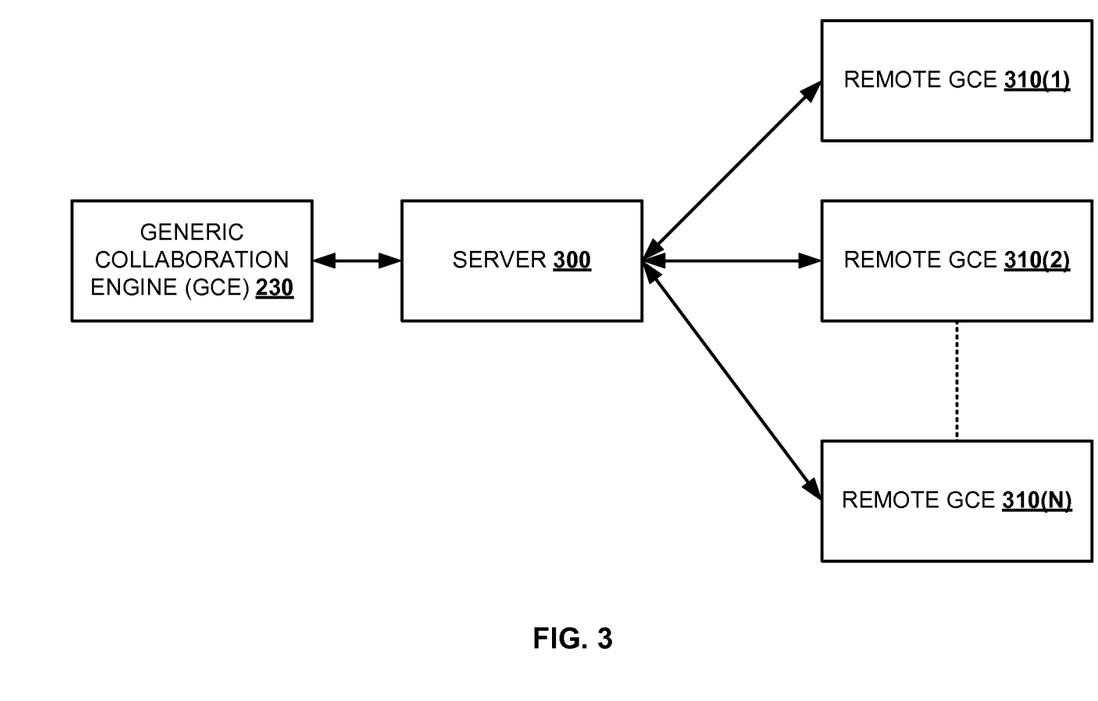
FIG. 3 is a block diagram of various generic collaboration engines in communication with a server, according to an embodiment of the invention.

FIG. 2 illustrates one embodiment of a system 200 including a universal collaboration adapter (UCA) 210 coupled to a web editor 220. According to one embodiment, the web editor 220 is based upon a document object model (DOM). A document (not shown) created from the web editor 220 may be represented in the DOM (e.g., a tree structure). The DOM representing the document is identified by the UCA 210. The UCA 210 identifies a manipulation performed on the DOM. The DOM is manipulated according to the document. An action (DOM operation) may be performed to manipulate the DOM. For example, if a paragraph is added to the document (e.g., HTML document), the action (e.g., create a text node) may be performed to manipulate the DOM according to the document. An event is triggered corresponding to the action performed on the DOM. The event is identified by the UCA 210. The UCA 210 selects an operation corresponding to the identified event. The operation may be an operational transformation (OT) operation supported by a generic collaboration engine (GCE) 230. In one embodiment, the UCA 210 converts (transforms) the event into the operation supported by the GCE 230. The operation is sent to the GCE 230. The GCE 230 transfers the operation to a server 300 (FIG. 3). The server 300 broadcasts or transmits the operation to one or more users or participants. Typically, the server 300 transmits the operation to one or more remote generic collaboration engine (GCE) 310 (1-*n*) associated with the one or more users.

Figure 4:
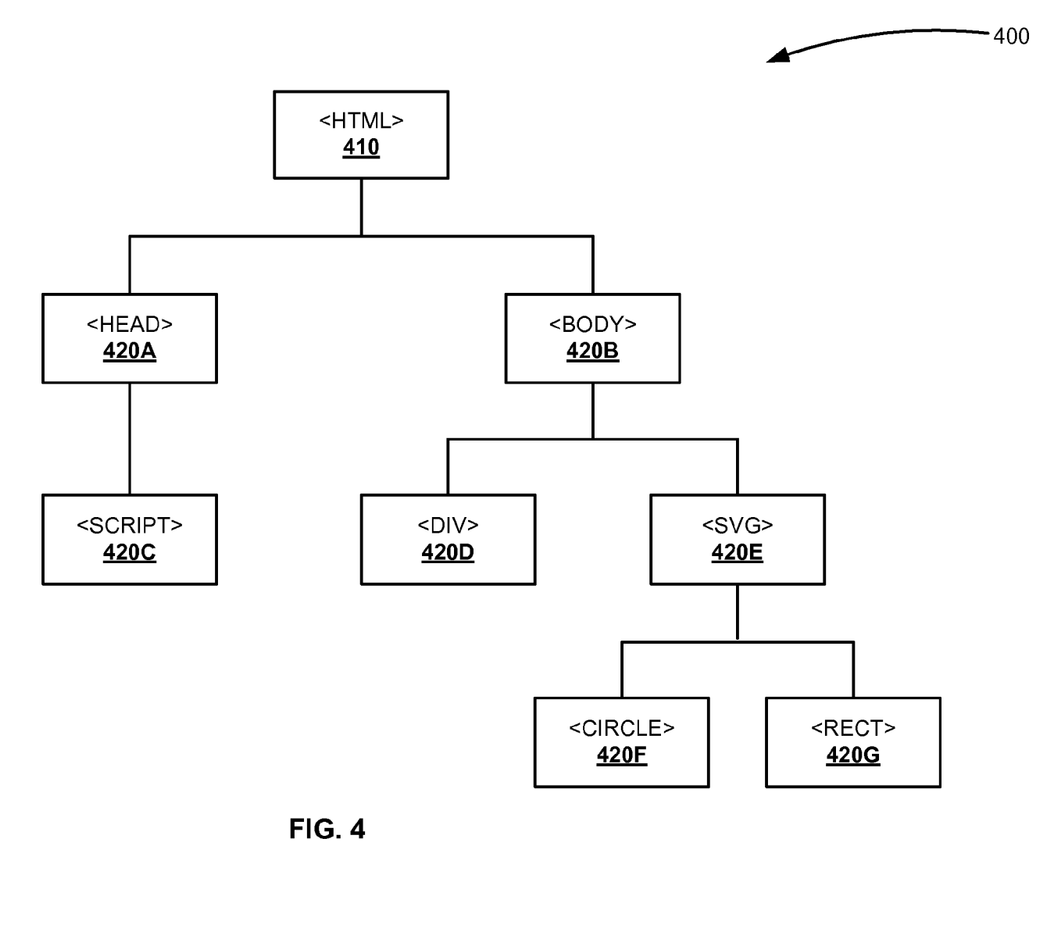
FIG. 4 illustrates the document object model representing an exemplary document in a tree structure, according to an embodiment of the invention.

The one or more users may require to work collaboratively on the document. The document may be created using the web editor 220. The web editor 220 may be based upon the DOM. Consequently, the document may be represented in the DOM (e.g., the tree structure). For example, the following HTML document may be represented in the tree structure 400, as illustrated in FIG. 4:

```
<html>
  <head>
    <script
      type="text/javascript"
      src="gci.js">
    </script>
  </head>
  <body>
    <div id="MyToolPalette">
    ............
    </div>
    <svg id="SyncRoot">
      <circle cx="30" cy="30" r="20" fill="white"/>
      <rect x="50" y="50" width="100" height="100" fill="white"/>
    </svg>
  </body>
</html>
```

Figure 5:
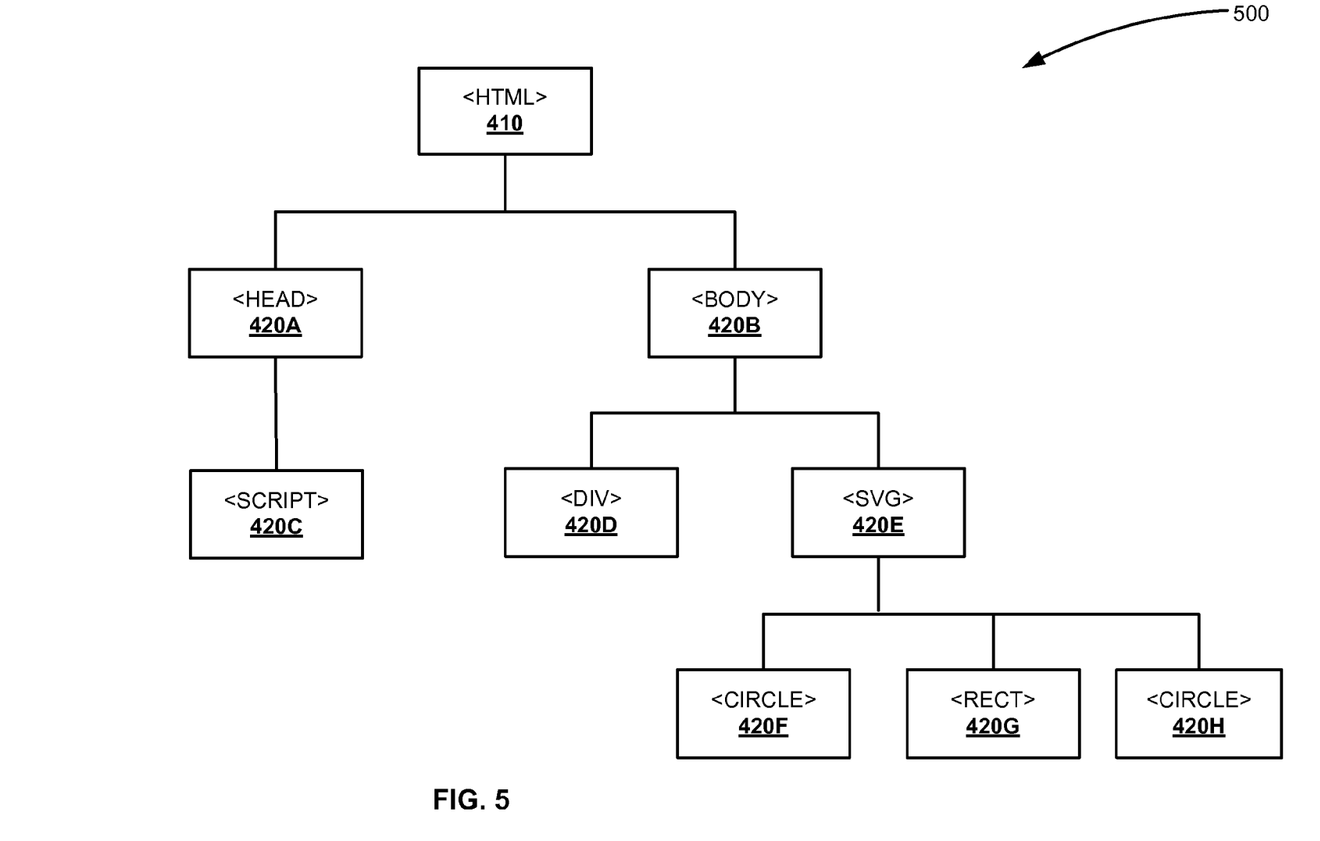
FIG. 5 illustrates a modified tree structure of FIG. 4, according to an exemplary embodiment of the invention.

The tree structure 400 includes a root node 410 (i.e., <html>) and multiple descendants 420 (*a-g*). Typically, the tree structure 400 including the root node 410 and the descendants 420 (*a-g*) may be manipulated corresponding to the modification in the document. For example, if a <circle> (e.g., <circle cx=30 cy=30 r=20 fill="red"/>) is created and appended under the <svg> element in the document, a new node 420*h* <circle> is included as a child node of the node 420*e* (i.e., <svg> node) and the tree structure 400 gets modified. Typically, the tree structure 400 is modified into a tree structure 500, as illustrated in FIG. 5. The tree structure 500 includes the new node 420*h* as the child node of the node 420*e* (<svg> node). Therefore, if the document is modified, the DOM or tree structure 400 is manipulated accordingly.

The DOM tree 400 is manipulated by executing the action or DOM operation. For example, the tree 400 may be transformed into the tree 500 by executing the DOM operation "create" (e.g., node 420*h*=document.createElementNS ('http://www.w3.org/2000/svg,' circle=) and the DOM operation "append" (e.g., node 420*e*.appendChild(node420*h*)). Once the DOM operation is performed, the event corresponding to the DOM operation may be triggered or fired. The event indicates that the DOM operation (e.g., create node) is performed on the DOM 400.

In one embodiment, the event may be one of the following:
   i.) E1: DOMNodeInserted->fired when the new node is added as the child node;
   ii.) E2: DOMNodeRemoved->fired when the node is removed;
   iii.) E3: DOMAttrModified->fired after an attribute of the node is modified; and
   iv.) E4: DOMCharacterDataModified->fired after character data within the node is modified.

Each event (E1-E4) corresponds to one or more respective DOM operations. For example, the event E1 (i.e., DOMNodeInserted) may correspond to the 'insert,' or 'append' operation, the event E2 (i.e., DOMNodeRemoved) may correspond to the 'remove'operation, the event E3 (i.e., DOMAttrModified) corresponds to the 'change attribute' operation, and the event E4 (i.e., DOMCharacterDataModified) corresponds to the 'change text' operation. In one embodiment, for example, if an attribute of a node is changed, the event E3 is fired. For example, if the fill color of the circle node changes from fill="white" to fill="red", then the event E3 is fired. Similarly, if the radius 'r' of the circle is changed from 20 to 40, then the event E3 is fired. In another embodiment, if text changes in a text node the event E4 is fired. For example, if the text in <p>Hello</p> changes to <p>Hello World</p>, the event E4 is fired.

Figure 6:
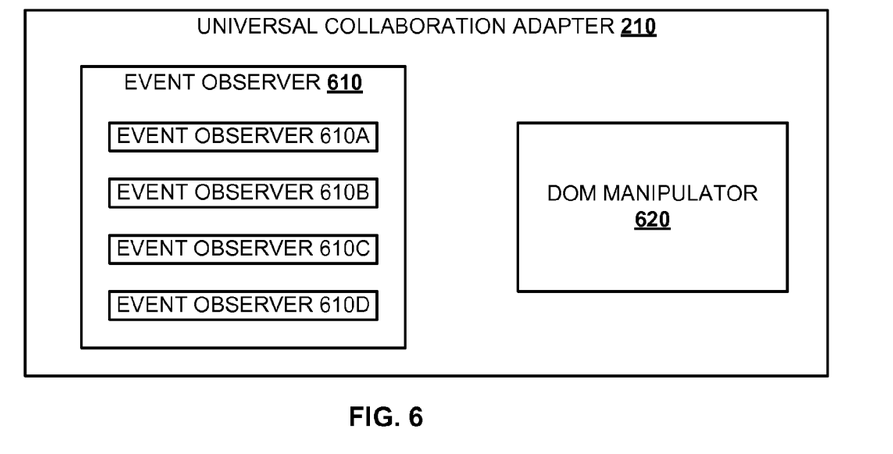
FIG. 6 is a block diagram of the universal collaboration adapter, according to an embodiment of the invention.

The event may be identified by the UCA 210. Typically, the UCA 210 includes an event observer (DOM listener) 610 to identify and record the event. For example, if a paragraph <p>Hello</p> is added to the HTML document, the DOM operation (e.g., create text node <p>) is executed to manipulate the DOM according to the manipulation in the HTML document. Once the text node <p> is created, the event E1 may be triggered. The event E1 indicates that the new node (i.e., node <p>) is inserted into the DOM. The event E1 (i.e, "DOMNodeInserted") is identified by the event observer 610.

There may be separate event observers 610(*a-d*) for each of the respective events (E1-E4). For example, there may be the event observer 610*a* for identifying or observing the event E1 (i.e., "DOMNodeInserted") and the event observer 610*b* for observing the event E2 (i.e., "DOMNodeRemoved"). Similarly, there may be the event observer 610*c* for observing the event E3 (i.e., "DOMAttrModified") and the event observer 610*d* for observing the event E4 (i.e., "DOMCharacterDataModified").

In one embodiment, one or more nodes 420 (*a-g*) may be registered with the one or more events observers 610(*a-d*) to identify the respective events. For example, the event observer 610*a* may be registered or added to the node 420*a* to observe the event "DOMNodeInserted". In one embodiment, the event observer 610*a* may be registered with the node 420*a* by including code. For example, the event observer 610*a* may be added to the node 420*a* by including the following code: node420*a*.addEventObserver("DOMNodeInserted," function() {...},false) to observe the event "DOMNodeInserted."

Once the event observer 610*a* is registered with the node 420*a*, the node 420*a* and each of its descendant nodes (e.g., 420*c*) may be observed by the event observer 610*a*. For example, if the new node is inserted as the child node of the node 420*c*, the event "DOMNodeInserted" is triggered and is identified by the event observer 610*a*. The event observer 610*a* registered with the node 420*a* observes events associated with the node 420*a* and each of its descendant nodes, e.g., 420*c*.

In one embodiment, the registered nodes (i.e., nodes registered with one or more events observers) are defined as a 'sync root node.' Each sync root node and its descendants are observed by their respective event observers. For example, the node 420*e* may be defined as the sync root node and registered with the event observers 610 (*a-d*) to identify the events "DOMNodeInserted," "DOMNodeRemoved,"

"DOMAttrModified," and "DOMCharacterDataModified," respectively. Each of the descendants 420 (f-g) of the sync root node 420e is automatically registered with the event observers 610(a-d) and will be observed by the event observers 610(a-d).

Once the event is identified, the UCA 210 selects an operation (e.g., the operational transformation (OT) operation) corresponding to the event. For example, if the event "DOMNodeInserted" is identified, the UCA 210 may select the OT operation (e.g., CreateNode). In one embodiment, the UCA 210 may generate the OT operation (e.g., CreateNode) corresponding to the event "DOMNodeInserted." In another embodiment, the event "DOMNodeInserted" may be mapped to other OT operations. The OT operation (e.g., CreateNode) may be transferred to the GCE 230. The GCE 230 transmits the OT operation (e.g., CreateNode) to the server 300. The server 300 transmits the OT operation (CreateNode) to the one or more users or participants. Typically, the server 300 transmits the OT operation (CreateNode) to the one or more generic collaboration engine (GCE) 310 (1-n) associated with the one or more users.

Figure 7:
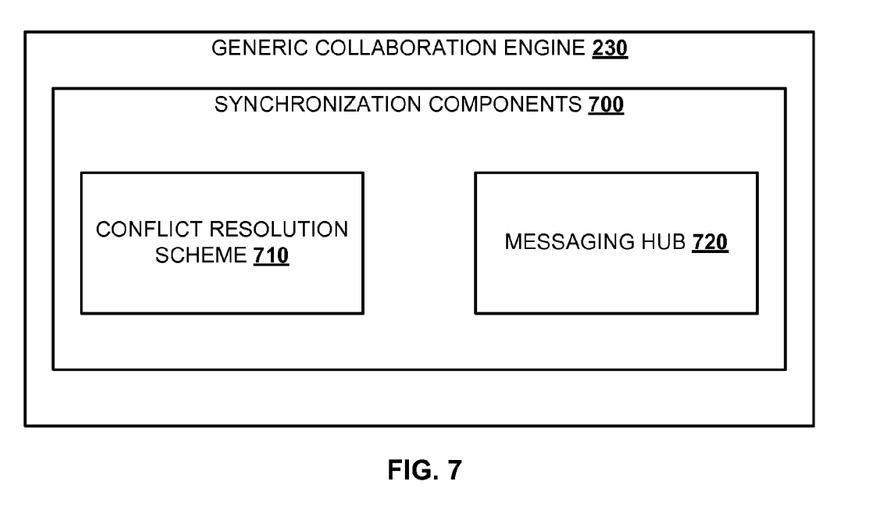
FIG. 7 is a block diagram of a generic collaboration engine, according to an embodiment of the invention.

In one embodiment, the server 300 may receive one or more remote OT operations from the one or more GCE 310 (1-n). The server 300 transfers the one or more remote OT operations to the GCE 230. The GCE 230 may include synchronization components 700 to resolve conflicts. The conflict may be generated from the OT operation corresponding to the event and the one or more remote OT operations received from the server 300. For example, if the OT operation corresponding to the event intends to add an element 'x' at position 2 in a word 'ABC' of the document (i.e., local operation ins('x', 2)) and the remote OT operation received from the server intend to add the element 'y' at position 2 of the same word 'ABC' (i.e., remote operation ins('y', 2)) then the conflict is generated. Typically, the synchronization components 700 include a conflict resolution scheme 710 to resolve the conflict. The conflict resolution scheme 710, e.g., operational transformation (OT) scheme may be used. Typically, in the OT conflict resolution scheme 710 before applying the remote OT operation to the local DOM, the remote OT operation is transformed/modified. The transformed remote operation may be transferred to the UCA 210.

The UCA 210 receives the one or more remote OT operations and/or the one or more transformed OT operations from the GCE 230. The UCA 210 converts each of the received OT operation into one or more DOM operations. The UCA 210 includes a manipulator 620 to convert the received OT operation into the one or more DOM operations. The DOM operations may be applied to the DOM. In one embodiment, the DOM operation may include, e.g., CreateAttribute(), CreateTextNode(), CreateElement(), etc. Consequently, the remote OT operations are replayed on the local DOM. In one embodiment, the synchronization component 700 may include a transformer, a composer, an OT document, and an OT processor, etc., to resolve the conflict. In another embodiment, the synchronization component 700 may include a messaging hub 720 to communicate with the server 300.

In one embodiment, the unregistered nodes (i.e., the nodes not registered with any of the event observers 610(a-d)) are not observed. For example, the node for tool palette (format node) may not be synced or registered with any of the event observers. Typically, the events triggered for the unregistered nodes will be filtered and will not be identified or transmitted (shared). Consequently, if a user selects a tool in the tool palette (e.g., font bold) then it would solely affect the user's editor instance and not the other participants' editor.

Figure 8:
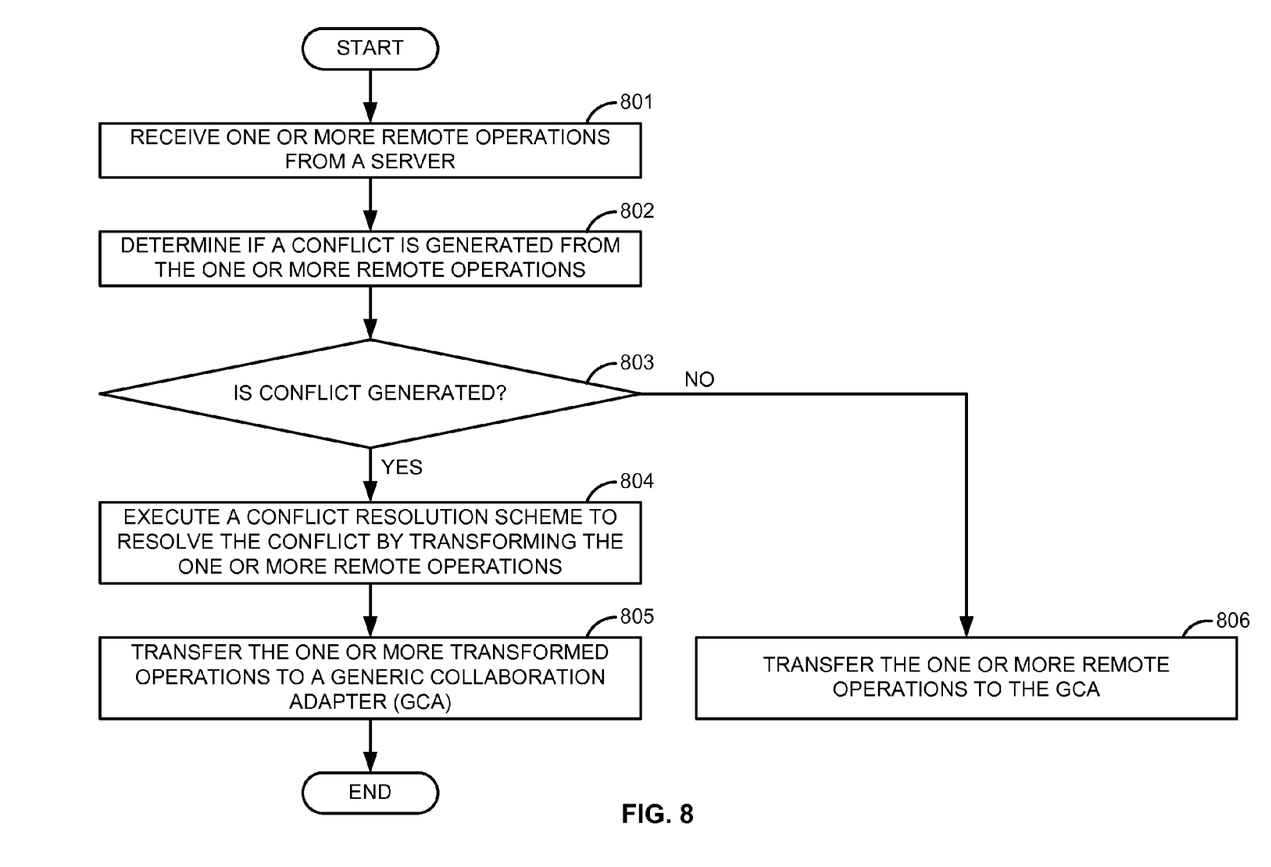
FIG. 8 is a flow chart illustrating the steps performed by the generic collaboration engine to identify and resolve a conflict, according to an embodiment of the invention.

FIG. 8 is a flowchart illustrating various steps performed by the generic collaboration engine (GCE) 230 to resolve the conflict. Typically, the GCE 230 receives the one or more remote operations (e.g., OT operations) from the server 300 at step 801. The GCE 230 may determine if the conflict is generated from the operation corresponding to the identified event and the one or more remote operations received from the server 300 at step 802. If the conflict is generated (step 803: YES), the GCE 230 executes the conflict resolution scheme 710 to resolve the conflict at step 804. Typically, the conflict resolution scheme 710 transforms the one or more remote operations received from the server 300. The one or more transformed operations and/or the one or more remote operations are transferred to the UCA 210 at step 805. In case the conflict is not generated (step 803: NO), the GCE 230 transfers the one or more remote operations received from the server 300 to the UCA 210 at step 806.

Figure 9:
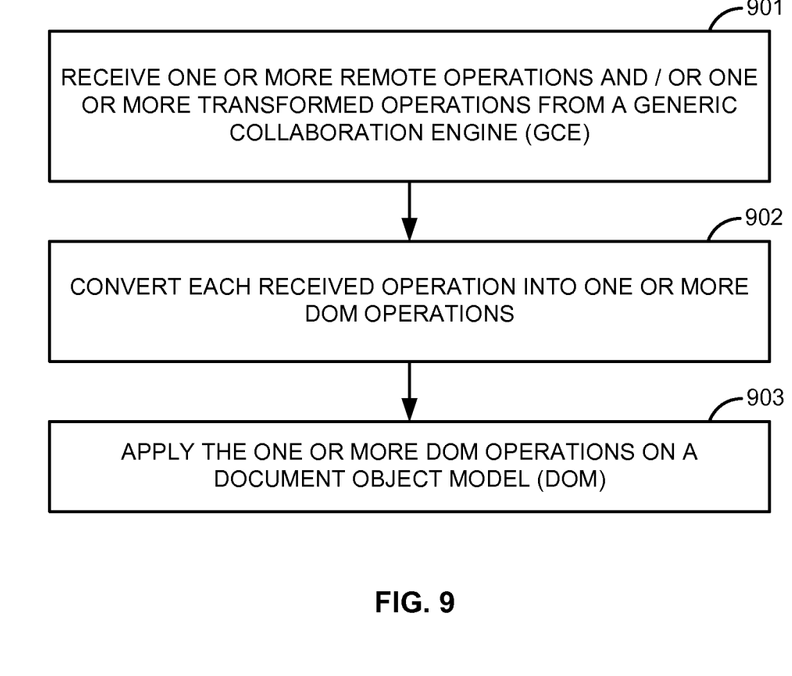
FIG. 9 is a flow chart illustrating the steps performed by the universal collaboration adapter to replay remote operations, according to an embodiment of the invention.

FIG. 9 is a flowchart illustrating various steps performed by the universal collaboration adapter (UCA) 230 to replay remote operations. The UCA 210 receives the one or more remote operations and/or the one or more transformed operations from the GCE 230 at step 901. Each received operation may be converted to the one or more DOM operations by the UCA 230 at step 902. The UCA 210 includes the DOM manipulator 620 to convert the received operation into the one or more DOM operations. The DOM operations may be applied to the DOM at step 903. Typically, the DOM operations are executed on the DOM.

Embodiments provide the universal collaboration adapter (UCA) for various DOM-based web editors. The UCA is reusable and therefore, the requirement of different collaboration adapter for different web editors is obviated. Further, the UCA is implemented on a platform and language neutral standardized interface (i.e., DOM's API) instead of the editor specific API. Consequently, the UCA identifies or records the DOM events (local DOM manipulations) corresponding to any editor-specific operations. Additionally, the UCA enables transformation of a single user web editor into a multi-user (collaborative) web editor. Typically, the recording of local DOM manipulations on the single-user web editor and replaying the remote DOM manipulations received from the multiple users (through the server) enables the transformation of the single-user web editor into the multi-user or collaborative web editor.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic indicator devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 10:
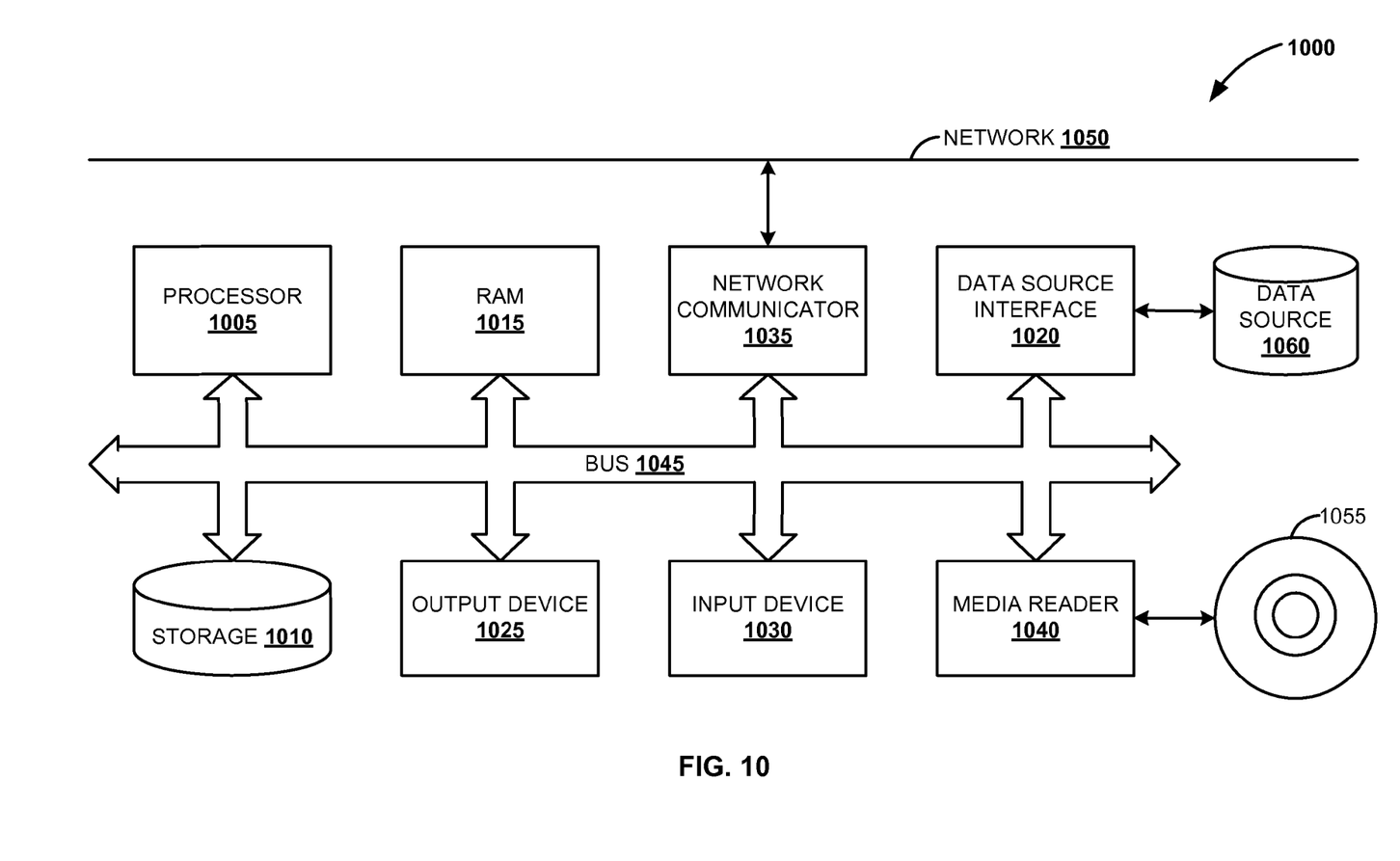
FIG. 10 is a block diagram of an exemplary computer system, according to an embodiment of the invention.

FIG. 10 is a block diagram of an exemplary computer system 1000. The computer system 1000 includes a processor 1005 that executes software instructions or code stored on a computer readable storage medium 1055 to perform the above-illustrated methods of the invention. The computer system 1000 includes a media reader 1040 to read the instructions from the computer readable storage medium 1055 and store the instructions in storage 1010 or in random access memory (RAM) 1015. The storage 1010 provides a large space for keeping static data where at least some instructions could be stored for later execution. The stored instructions may be further compiled to generate other representations of the instructions and dynamically stored in the RAM 1015. The processor 1005 reads instructions from the RAM 1015 and performs actions as instructed. According to one embodiment of the invention, the computer system 1000 further includes an output device 1025 (e.g., a display) to provide at least some of the results of the execution as output including, but not limited to, visual information to users and an input device 1030 to provide a user or another device with means for entering data and/or otherwise interact with the computer system 1000. Each of these output devices 1025 and input devices 1030 could be joined by one or more additional peripherals to further expand the capabilities of the computer system 1000. A network communicator 1035 may be provided to connect the computer system 1000 to a network 1050 and in turn to other devices connected to the network 1050 including other clients, servers, data stores, and interfaces, for instance. The modules of the computer system 1000 are interconnected via a bus 1045. Computer system 1000 includes a data source interface 1020 to access data source 1060. The data source 1060 can be accessed via one or more abstraction layers implemented in hardware or software. For example, the data source 1060 may be accessed by network 1050. In some embodiments the data source 1060 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system, e.g., an ERP system, and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:

identify a document object model (DOM) for a document, wherein the DOM comprises a plurality of nodes registered with a corresponding event observer to identify one or more actions performed on the registered plurality of nodes;

receive an event trigger from the event observer in response to identifying an action performed on a node from the registered plurality of nodes;

identify, in response to the event trigger, an operational transformation command corresponding to the detected action; and send the identified operational transformation command to a generic collaboration engine for transmission to one or more users through a server.

2. The article of manufacture of claim 1, wherein the action includes at least one of addition of a node in the trees structure, removal of the node from the tree structure, modification of one or more attributes associated with the node, and modification of data included within the node.

3. The article of manufacture of claim 1, wherein a descendant of a registered parent node from the registered plurality of nodes is automatically registered with the event observer.

4. The article of manufacture of claim 1, wherein the generic collaboration engine is configured to receive one or more remote operational transformation commands from the server.

5. The article of manufacture of claim 4, wherein the generic collaboration engine comprises a conflict resolution scheme to:
identify a conflict generated from the identified operational transformation command and at least one received remote operational transformation command from the one or more remote operational transformation commands; and
resolve the conflict by transforming the at least one received remote operational transformation command.

6. The article of manufacture of claim 5 further comprising instructions which when executed cause the computer to:
identify one or more DOM operations corresponding to the transformed at least one operational transformation command; and
execute the identified one or more DOM operations on the document object model.

7. A computer-implemented method for a universal collaboration adapter, the method comprising:
identifying a document object model (DOM) for a document, wherein the DOM comprises a plurality of nodes registered with a corresponding event observer to identify one or more actions performed on the registered plurality of nodes;
receiving an event trigger from the event observer in response to identifying an action performed on a node from the registered plurality of nodes;
identifying, in response to the event trigger, an operational transformation command corresponding to the detected action; and
sending the identified operational transformation command to a generic collaboration engine for transmission to one or more users through a server.

8. The method of claim 7, wherein the generic collaboration engine is configured to:
receive one or more remote operational transformation commands from the server;
identify whether a conflict is generated from the identified operational transformation command and the at least one remote operational transformation command from the received one or more remote operational transformation commands; and
when the conflict is generated, execute a conflict resolution scheme to resolve the conflict by transforming the at least one received operational transformation command.

9. The method of claim 8 further comprising:
identifying one or more DOM operations corresponding to the transformed at least one operational transformation command; and
executing the identified one or more DOM operations on the document object model.

10. A computer system for a universal collaboration adapter for web editors, comprising:
a memory to store program code; and
a processor communicatively coupled to the memory, the processor configured to execute the program code to:
identify a document object model (DOM) for a document, wherein the DOM comprises a plurality of nodes registered with a corresponding event observer to identify one or more actions performed on the registered plurality of nodes;
receive an event trigger from the event observer in response to identifying an action performed on a node from the registered plurality of nodes;
identify, in response to the event trigger, an operational transformation command corresponding to the detected action; and
send the identified operational transformation command to a generic collaboration engine for transmission to one or more users through a server.

11. The computer system of claim 10, wherein the processor is further configured to:
receive one or more remote operational transformation commands from the server;
identify whether a conflict is generated from the identified operational transformation command and at least one received remote operational transformation command from the one or more remote operational transformation commands; and
when the conflict is generated, execute a conflict resolution scheme to resolve the conflict by transforming the at least one received remote operational transformation command.

12. The computer system of claim 11, wherein the processor is further configured to:
identify one or more DOM operations corresponding to the transformed at least one operational transformation command; and
execute the identified one or more DOM operations on the DOM.

13. The computer system of claim 10 claim, where in the action includes at least one of addition of a new node in the tree structure, removal of the node from the tree structure, and modification of the node in the tree structure.

14. The computer system of claim 13, wherein modification of the node includes at least one of modification of one or more attributes associated with the node and modification of data included within the node.

15. The article of manufacture of claim 1, wherein the DOM further comprises one or more unregistered nodes.

16. The article of manufacture of claim 15, wherein an action performed on an unregistered node is not identified and no event is triggered in response to the action performed on the unregistered node.

17. The computer system of claim 10, wherein the DOM further comprises one or more unregistered nodes.

18. The computer system of claim 17, wherein an action performed on an unregistered node is not identified and no event is triggered in response to the action performed on the unregistered node.

* * * * *